(12) United States Patent
Nair et al.

(10) Patent No.: US 10,498,663 B2
(45) Date of Patent: Dec. 3, 2019

(54) PROFILE-BASED CACHE MANAGEMENT

(71) Applicant: Amazon Technologies, Inc., Reno, NV (US)

(72) Inventors: Aakarsh Nair, Seattle, WA (US); Bryan Moffatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 491 days.

(21) Appl. No.: 14/207,324

(22) Filed: Mar. 12, 2014

(65) Prior Publication Data
US 2015/0263977 A1    Sep. 17, 2015

(51) Int. Cl.
*H04L 29/08*     (2006.01)
*H04L 12/911*    (2013.01)

(52) U.S. Cl.
CPC .......... *H04L 47/70* (2013.01); *H04L 67/2852* (2013.01); *H04L 67/30* (2013.01); *H04L 67/2833* (2013.01)

(58) Field of Classification Search
CPC . G06F 17/3089–30905; H04L 67/2842–2857; H04L 67/02
See application file for complete search history.

(56) References Cited

U.S. PATENT DOCUMENTS 6,622,168 B1 *  9/2003  Datta ................ G06F 17/30902
                                           707/E17.12
6,988,135 B2 *  1/2006  Martin .............. G06F 17/30902
                                           707/E17.12

(Continued)

FOREIGN PATENT DOCUMENTS

JP    2008-070949 A    3/2008
JP    2009-157444 A    7/2009

(Continued)

OTHER PUBLICATIONS

Hayden, A., Remote Browsing and Searching, filed as U.S. Appl. No. 13/358,989, on Jan. 26, 2012.

(Continued)

*Primary Examiner* — Emmanuel L Moise
*Assistant Examiner* — Julian Chang
(74) *Attorney, Agent, or Firm* — Knobbe, Martens, Olson & Bear, LLP

(57) ABSTRACT

A system and method for profile-based cache management is disclosed. A cache management service can obtain a plurality of requests for network resource and corresponding responses, group the requests based, at least in part, on various criterion or technique, determine and cache content parts of the responses corresponding to each group of requests. Cache profiles corresponding to each group of requests and identifying corresponding cached content parts can be built, maintained or updated by the cache management service. A subsequent request for network resource can be matched to one or more cache profiles for retrieval of applicable cached content and for generation of a partial response to the request therefrom. Non-cached content or updates to cached content can be further retrieved for generation of updating data to the partial response, and thus completing a full response to the request for network resource.

19 Claims, 8 Drawing Sheets

(56) References Cited

U.S. PATENT DOCUMENTS

| | | | | |
|---|---|---|---|---|
| 8,195,634 B2 * | 6/2012 | Kumar | G06F 17/30867 | 707/706 |
| 8,516,193 B1 * | 8/2013 | Clinton | H04L 67/1097 | 706/47 |
| 8,707,162 B1 * | 4/2014 | Jain | G06F 17/30902 | 715/234 |
| 8,850,308 B1 * | 9/2014 | Roselander | G06Q 10/06398 | 705/7.38 |
| 9,055,124 B1 * | 6/2015 | Hill | H04L 65/403 | |
| 9,075,893 B1 * | 7/2015 | Jenkins | G06F 17/30902 | |
| 9,158,845 B1 * | 10/2015 | Reddy | G06F 16/951 | |
| 9,703,885 B2 * | 7/2017 | Scheevel | G06F 17/30887 | |
| 9,953,052 B1 * | 4/2018 | Hill | H04L 67/42 | |
| 2002/0007404 A1 * | 1/2002 | Vange | G06F 9/5027 | 709/217 |
| 2003/0061278 A1 * | 3/2003 | Agarwalla | G06F 17/30902 | 709/203 |
| 2003/0061442 A1 * | 3/2003 | Cox | G06F 17/30902 | 711/118 |
| 2003/0083755 A1 * | 5/2003 | Denoual | G06F 17/30905 | 700/2 |
| 2003/0140100 A1 * | 7/2003 | Pullara | H04L 29/06 | 709/203 |
| 2003/0158958 A1 * | 8/2003 | Chiu | H04N 7/173 | 709/231 |
| 2003/0191812 A1 * | 10/2003 | Agarwalla | G06F 17/30902 | 709/217 |
| 2004/0005894 A1 * | 1/2004 | Trossen | H04W 36/0011 | 455/436 |
| 2004/0015538 A1 * | 1/2004 | Agarwalla | G06F 17/30905 | 709/203 |
| 2004/0133538 A1 * | 7/2004 | Amiri | G06F 17/30457 | |
| 2004/0167961 A1 * | 8/2004 | Jain | G06F 17/30902 | 709/203 |
| 2004/0205165 A1 * | 10/2004 | Melamed | G06F 17/30902 | 709/219 |
| 2004/0254844 A1 * | 12/2004 | Torres | G06Q 30/02 | 705/26.1 |
| 2004/0260676 A1 * | 12/2004 | Douglis | G06F 17/3089 | |
| 2005/0015550 A1 * | 1/2005 | Challenger | G06F 17/30902 | 711/118 |
| 2007/0198687 A1 * | 8/2007 | Kasriel | H04L 67/2814 | 709/223 |
| 2007/0266113 A1 * | 11/2007 | Koopmans | G06F 17/3048 | 709/217 |
| 2008/0229025 A1 * | 9/2008 | Plamondon | G06F 12/0862 | 711/126 |
| 2008/0285074 A1 * | 11/2008 | Wilson | G06F 17/248 | 358/1.15 |
| 2009/0150518 A1 * | 6/2009 | Lewin | H04L 67/2842 | 709/219 |
| 2009/0165115 A1 | 6/2009 | Toumura et al. | | |
| 2009/0254707 A1 * | 10/2009 | Alstad | G06F 17/30902 | 711/118 |
| 2010/0088326 A1 * | 4/2010 | Chen | G06F 17/3089 | 707/756 |
| 2010/0332588 A1 * | 12/2010 | Schwimer | H04L 67/306 | 709/203 |
| 2011/0022947 A1 * | 1/2011 | Rajkumar | G06F 17/30902 | 715/235 |
| 2011/0093790 A1 * | 4/2011 | Maczuba | G06F 17/30902 | 715/745 |
| 2011/0137888 A1 * | 6/2011 | Yoo | G06F 17/30902 | 707/713 |
| 2011/0258532 A1 * | 10/2011 | Ceze | G06F 17/30902 | 715/234 |
| 2011/0276569 A1 * | 11/2011 | Kanefsky | G06F 12/0868 | 707/736 |
| 2012/0191804 A1 * | 7/2012 | Wright | G06F 17/30902 | 709/217 |
| 2012/0259942 A1 * | 10/2012 | Brookins | H04L 67/28 | 709/213 |
| 2012/0290447 A1 * | 11/2012 | Hershenson | G06Q 30/0277 | 705/27.2 |
| 2012/0290790 A1 | 11/2012 | Meirosu et al. | | |
| 2012/0303697 A1 * | 11/2012 | Alstad | G06F 17/3089 | 709/203 |
| 2012/0331228 A1 * | 12/2012 | Shatz | G06F 17/30902 | 711/118 |
| 2013/0226942 A1 * | 8/2013 | Denoual | G06F 17/3005 | 707/754 |
| 2013/0297717 A1 | 11/2013 | Sivasubramanian et al. | | |
| 2013/0346475 A1 * | 12/2013 | Jasperson | H04L 67/02 | 709/203 |
| 2013/0346476 A1 * | 12/2013 | Jasperson | H04L 67/142 | 709/203 |
| 2014/0075109 A1 | 3/2014 | Richardson et al. | | |
| 2014/0136952 A1 * | 5/2014 | Zhu | G06F 16/9574 | 715/234 |
| 2014/0280515 A1 * | 9/2014 | Wei | H04L 67/02 | 709/203 |
| 2014/0281918 A1 * | 9/2014 | Wei | H04L 67/02 | 715/234 |
| 2015/0039713 A1 * | 2/2015 | Martini | H04L 67/2852 | 709/213 |
| 2015/0088970 A1 * | 3/2015 | Wei | H04L 67/10 | 709/203 |
| 2015/0095305 A1 * | 4/2015 | Tripp | G06F 17/30864 | 707/709 |
| 2015/0172410 A1 * | 6/2015 | Scoles | H04L 67/2847 | 709/213 |
| 2015/0207897 A1 * | 7/2015 | Flack | H04L 67/32 | 709/213 |
| 2015/0254347 A1 * | 9/2015 | Mosko | G06F 17/30864 | 370/392 |
| 2015/0256639 A1 * | 9/2015 | Chow | H04L 67/2842 | 709/213 |
| 2015/0304444 A1 * | 10/2015 | Lundborg | H04L 67/2842 | 709/213 |
| 2016/0225059 A1 * | 8/2016 | Chow | G06Q 30/0625 | |
| 2016/0292292 A1 * | 10/2016 | Scheevel | G06F 17/30902 | |
| 2016/0344842 A1 * | 11/2016 | Desai | H04L 61/10 | |

FOREIGN PATENT DOCUMENTS

| | | |
|---|---|---|
| JP | 2010-224861 A | 10/2010 |
| JP | 2011-518376 A | 6/2011 |
| JP | 2012-522322 A | 9/2012 |
| WO | WO 2009/124011 A2 | 10/2009 |
| WO | WO 2010/117748 A2 | 10/2010 |

OTHER PUBLICATIONS

Hill, Peter F., Interaction Based Prioritized Retrieval of Embedded Resources, filed as U.S. Appl. No. 13/428,498 on Mar. 23, 2012.

Hill, Peter F., Optimized Retrieval of Network Resources, filed as U.S. Appl. No. 13/431,687 on Mar. 27, 2012.

HTML, <http://en.wikipedia.org/wiki/HTML>, accessed Dec. 3, 2013.

Office Action dated Aug. 7, 2017, issued in corresponding Japanese Patent Application No. 2016-555962.

Office Action dated Apr. 23, 2018, issued in corresponding Japanese Patent Application No. 2016-555962.

Extended European Search Report dated Sep. 18, 2017, issued in corresponding European Patent Application No. 15760656.7.

International Search Report and Written Opinion dated Jun. 15, 2015, issued in corresponding International Patent Application No. PCT/US2015/020003.

International Preliminary Report on Patentability dated Sep. 22, 2016, issued in corresponding International Patent Application No. PCT/US2015/020003.

* cited by examiner

PROFILE-BASED CACHE MANAGEMENT

BACKGROUND

Generally described, computing devices and communication networks can be utilized to exchange information. In a common application, a computing device can request content from another computing device via the communication network. For example, a user at a personal computing device can utilize a software browser application to request a network resource, such as a Web page, from a server computing device via the Internet. In such embodiments, the user computing device can be referred to as a client computing device and the server computing device can be referred to as a content provider.

Content providers are generally motivated to provide requested content to client computing devices via efficient transmission of the content. Users are generally interested in receiving content or having content rendered promptly. Some content providers attempt to facilitate the delivery of requested content, such as Web pages or resources identified in Web pages, through a network computing provider that caches frequently accessed content or resources.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
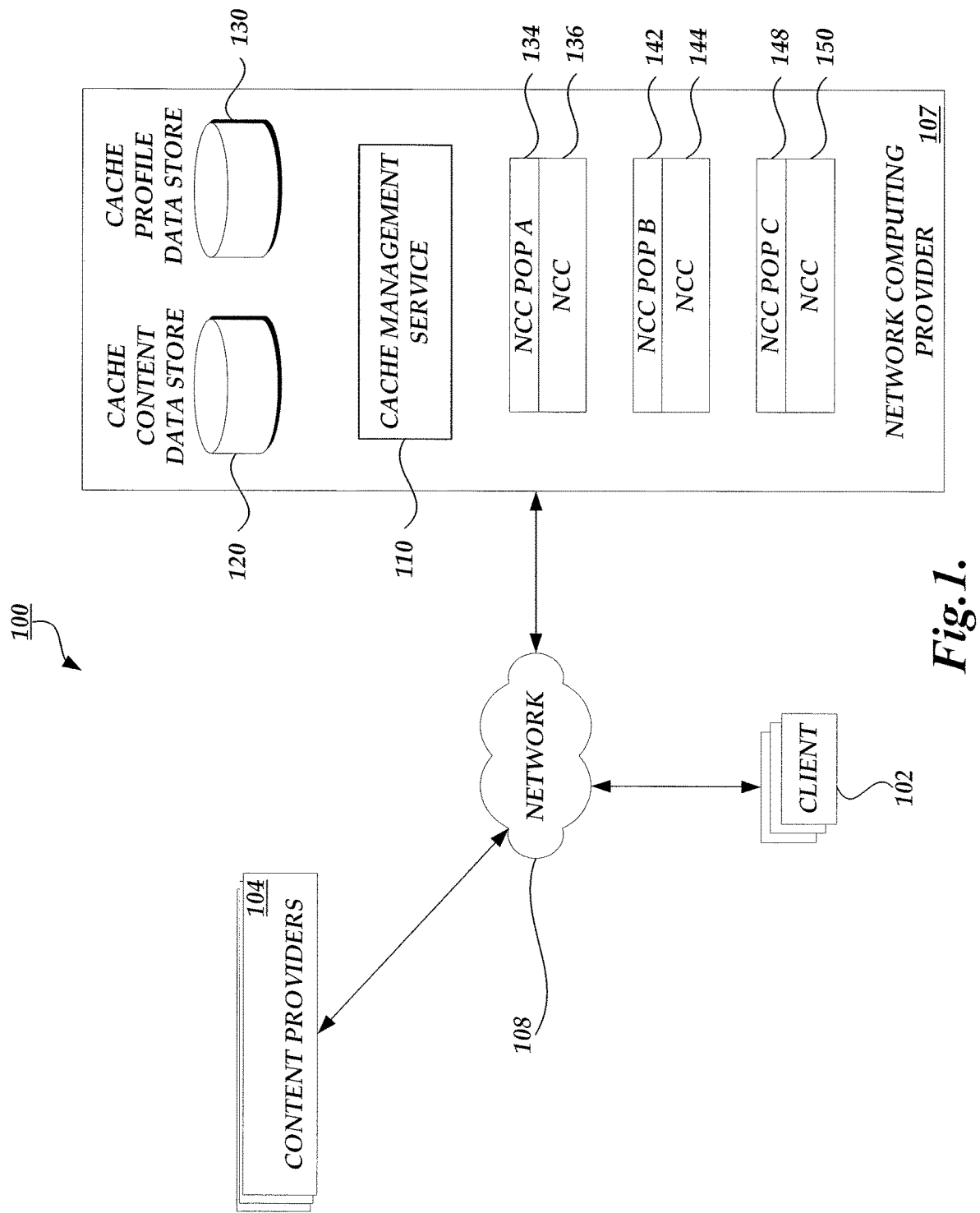
FIG. 1 is a block diagram illustrative of one embodiment of a networked computing environment including a network computing provider that hosts a cache management service.

Generally described, the present disclosure is directed to the management of cache resources utilized when a client computing device requests content from a network entity, such as a content provider. Specifically, aspects of the disclosure will be described with regard to the analysis of content requests and corresponding responses of content provided by a content provider. Additionally, aspects of the disclosure also include establishing and updating of cached data based, at least in part, on the analysis, and in response to a client request, the retrieval and utilization of cached content from the managed cache.

With reference to an illustrative example, a network computing provider obtains a number of requests from one or more client computing devices for content provided by one or more content providers in the form of a markup language, such as HTML. A cache management service associated with the network computing provider analyzes the requests as well as requested content to determine which portions of the HTML content remain substantially constant. The cache management service can build and update cache profiles corresponding to content requests or content providers. These cache profiles can identify relevant portions of the HTML content that can be cached. Accordingly, subsequent client requests for the requested content can be processed, at least in part, with cached portions of the HTML content. Thereafter, the network computing provider can request any remaining portions of non-cached HTML content from a content provider. The remaining portions of non-cached HTML content can be incorporated as updates to the cached content. The non-cached content and updates can be transmitted in appropriate form to the requesting client computing device, enabling it to completely render the content requested.

In one embodiment, in order to determine which portions of the HTML content can be cached, the cache management system analyzes content requests and corresponding responses during a specified period of time. For example, one or more clients may request a same identified network resource multiple times during the specified period of time. The cache management service may analyze corresponding HTML content responses to these requests over the specified period of time, determine parts or sections within the responses that are not likely to change, and store cacheable content corresponding to the determined parts or sections in a cache data store. A cache profile identifying the cached content can be created for content requests directed at the same network resource.

In addition to a temporal analysis, the cache management system can perform analysis of content requests and corresponding responses across any attributes or information associated with the content requests, client devices, users, network resource identifiers, or content providers. Various clustering or classification methods can be utilized to identify or define groups of content requests and their corresponding responses. Cacheable content parts, such as certain HTML elements common to a group of responses, can be determined and stored. Cache profiles corresponding to the groups can be established, which identify the determined cached content. The groups may or may not be mutually exclusive. Accordingly, cache profiles corresponding to the groups can form a hierarchy, such as a tree structure or lattice.

With the profile-based cache information, a network computing provider may respond to a client request for content, by first retrieving and delivering relevant cached portions of HTML to a requesting client computing device. This way, the client computing device can at least partially render a result while other content portions are being obtained. For example, the cache management service may identify one or more cache profiles that the client request matches, retrieve cached content as identified by the one or more cache profiles, assemble an initial result including cached HTML, and transmit the initial result to the requesting client computing device. Sequentially or in parallel, the network computing provider may request non-cached content or updates to the cached content from one or more third party content providers, compile corresponding updating data and forwarding the updating data to the requesting client computing device.

Although various aspects of the disclosure will be described with regard to illustrative examples and embodiments, one skilled in the art will appreciate that the disclosed embodiments and examples should not be construed as limiting. More specifically, although various examples and illustrative embodiments will be described with regard to requested HTML-based content, one skilled in the relevant art will appreciate that other forms of requested content, including, but not limited to, extensible markup language ("XML")-based content, scripts or other content encoding algorithms, may be utilized in accordance with the present disclosure.

FIG. 1 is a block diagram illustrative of one embodiment of a networked computing environment including a network computing provider 107 that hosts a cache management service 110. As illustrated in FIG. 1, the networked computing environment 100 includes a number of client computing devices 102 (generally referred to as clients) for requesting content from one or more content providers 104. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browsers that facilitate communications via the Internet or an intranet.

Additionally, the client computing devices 102 may also include necessary hardware and software components to execute, or otherwise process, cache related information as will be described in greater detail below. One skilled in the relevant art will appreciate that additional hardware/software components for processing the cache related information may be included with the execution of a multi-purpose software application, such as a browser. Alternatively, some or all of the additional hardware/software components may be embodied in standalone or specialized components configured for processing the cache related information. Although not illustrated in FIG. 1, each client computing device 102 utilizes some type of local DNS resolver component, such as a DNS Name server, that generates the DNS queries attributed to the client computing device.

The networked computing environment 100 can also include one or more content providers 104 in communication with the one or more client computing devices 102 via the communication network 108. Individual content providers 104 illustrated in FIG. 1 correspond to a logical association of one or more computing devices associated with a content provider. Specifically, the content provider 104 can include a web server component corresponding to one or more server computing devices for obtaining and processing requests for content (such as Web pages) from the client computing devices 102 or the network computing provider 107. One skilled in the relevant art will appreciate that the content provider 104 can be associated with various additional computing resources, such additional computing devices for administration of content and resources, DNS name servers, and the like.

With continued reference to FIG. 1, the networked computing environment 100 can also include a network computing provider 107 in communication with the one or more client computing devices 102, and the content providers 104 via the communication network 108. The network computing provider 107 illustrated in FIG. 1 also corresponds to a logical association of one or more computing devices associated with a network computing provider. Specifically, the network computing provider 107 can include a number of Point of Presence (POP) locations 134, 142, 148 that correspond to nodes on the communication network 108. Each POP 134, 142, 148 includes a network computing component (NCC) 136, 144, 150 for hosting applications, such as browser applications or data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based, at least in part, on a specific request, such as from a client computing device, or the NCC can initiate dynamic creation of an instance of a virtual machine on its own. Each NCC POP 134, 142, 148 also includes a storage component made up of a number of storage devices for storing any type of data used in the delivery and processing of network or computing resources. The NCCs 136, 144, 150 may further include additional software and/or hardware components that facilitate communications including, but not limited to, load balancing or load sharing software/hardware components for selecting instances of a virtual machine supporting a requested application and/or providing information to a DNS name server to facilitate request routing.

In an illustrative embodiment, although the NCC POPs 134, 142, 148 are illustrated in FIG. 1 as logically associated with a network computing provider 107, the NCC POPs can be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 can be managed by the same or different entities.

As further illustrated in FIG. 1, the network computing provider 107 can include a cache management service 110, a cache content data store 120, and a cache profile data store 130, configured to execute the methods for cache management described herein. The cache management service 110 can be implemented to analyze various client requests for content and corresponding responses provided to the clients including content provided by one or more content providers. The cache management service 110 can also be implemented to build, maintain and update cache profiles and cached content based, at least in part, on the analysis, which can be utilized to expedite the processing of subsequent client requests for content. The cache management service 110 can further facilitate the processing of various client requests for content. For example, the cache management service 110 may identify matching cache profiles, retrieve proper cached content, assemble and transmit initial results and corresponding updating data. Although illustrated as a single component in FIG. 1, the cache management service 110 may correspond to any number of network-based computing devices, including physical computing devices, virtualized computing device hosted on a physical machine, or some combination thereof. Still further, the cache management service 110 may be hosted as part of the network computing provider 107 or may be provided independent of the network computing provider 107.

The cache content data store 120 can store content, parts of content, or any information or data relevant to network content and resources. The cache content data store 120 can generally include any repository, database, or information storage system embodied in non-transitory computer readable media such as a disk memory, flash memory, optical memory and the like. Even further, the cache content data store 120 can include network-based memories. Although illustrated as a single component, the cache content data store 120 may be implemented in a distributed fashion to optimize its communication with the cache management service 110.

The cache profile data store 130 can store relational data between or among any attributes of requests for content, identification or reference of various cached content, semantics or other information related to cached content or network resources. The cache profile data store 130 can generally include any repository, database, or information storage system embodied in non-transitory computer readable media such as a disk memory, flash memory, optical memory and the like. Even further, the cache profile data store 130 can include network-based memories. Although illustrated as a single entity, the cache profile data store 130 may be implemented in a distributed fashion to optimize its communication with the cache management service 110.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
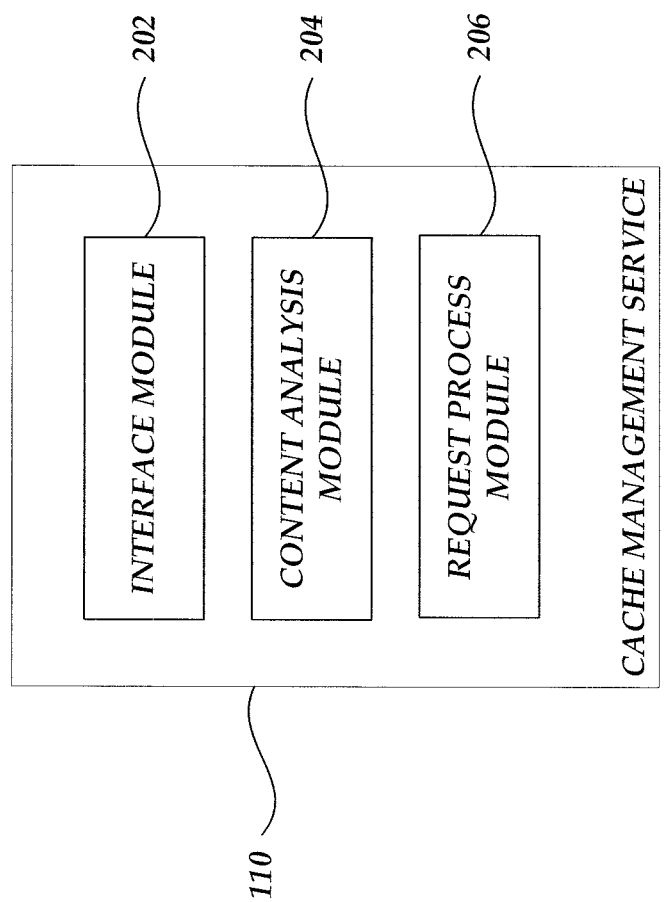
FIG. 2 is a block diagram illustrative of one embodiment of a cache management service.

FIG. 2 is a block diagram illustrative of one embodiment of a cache management service 110 such as the cache management service depicted in FIG. 1. Illustratively, the cache management service 110 may include an interface module 202, a content analysis module 204 and a request process module 206, for carrying out various cache management methods and processes described herein. The interface module 202 can communicate with client computing devices 102 in various ways. For example, to obtain content requests from, and to deliver responses to the content requests, such as initial results incorporating cached content and subsequent updating data, to the client computing devices 102. Alternatively, or in addition, the interface module 202 can communicate with virtual machines or browsers instantiated at one or more NCC's of the network computing provider 107, which are associated with client computing devices by remote browse sessions corresponding to respective content requests. In this embodiment, the interface module 202 obtains client content requests from, and delivers responses including initial results and updating data to, the virtual machine or browser instances, which in turn communicate with the respective content requesting client computing devices 102.

Illustratively, the content analysis module 204 can implement various computational, statistical, or machine learning methods, for example, clustering or classification algorisms to group or categorize client requests and corresponding responses, to derive respective cacheable data, and to build or update cache profiles based thereon. The client requests and corresponding responses analyzed by the content analysis module 204 can be forwarded from the interface module 202, or, can be obtained from a repository or storage system of the network computing provider 107 that maintains such information. The request process module 206 can process client requests for content, such as network resources, and generate corresponding responses. Specifically, the client request can be forwarded to the request process module 206 by the interface module 202. The request process module 206 can match the client request with one or more cache profiles, retrieve cached content identified by the cache profiles, generate an initial result corresponding to the client request incorporating the retrieved cached content, obtain non-cached content or updates to the cached content, and generate updating data for the initial result. Sequentially or in parallel, the initial result and the updating data can be forwarded to the interface module 202 by the request process module 206.

The cache management service 110 may include additional or different modules or components which may facilitate or implement the various cache management methods and processes described herein. Further, the modules or components may include additional components, systems and subsystems for facilitating the methods and processes.

With reference now to FIGS. 3A-3D, the interaction between various components of the networked computing environment 100 of FIG. 1 will be illustrated. For purposes of the examples, however, the illustrations have been simplified such that many of the components utilized to facilitate communications are not shown. One skilled in the relevant art will appreciate that such components can be utilized and that additional interactions would accordingly occur without departing from the spirit and scope of the present disclosure. Additionally, although communications may be illustrated as direct communications between components, one skilled in the relevant art will appreciate that all the illustrative communications may occur directly between components or facilitated via the communication network 108.

Figure 3A:
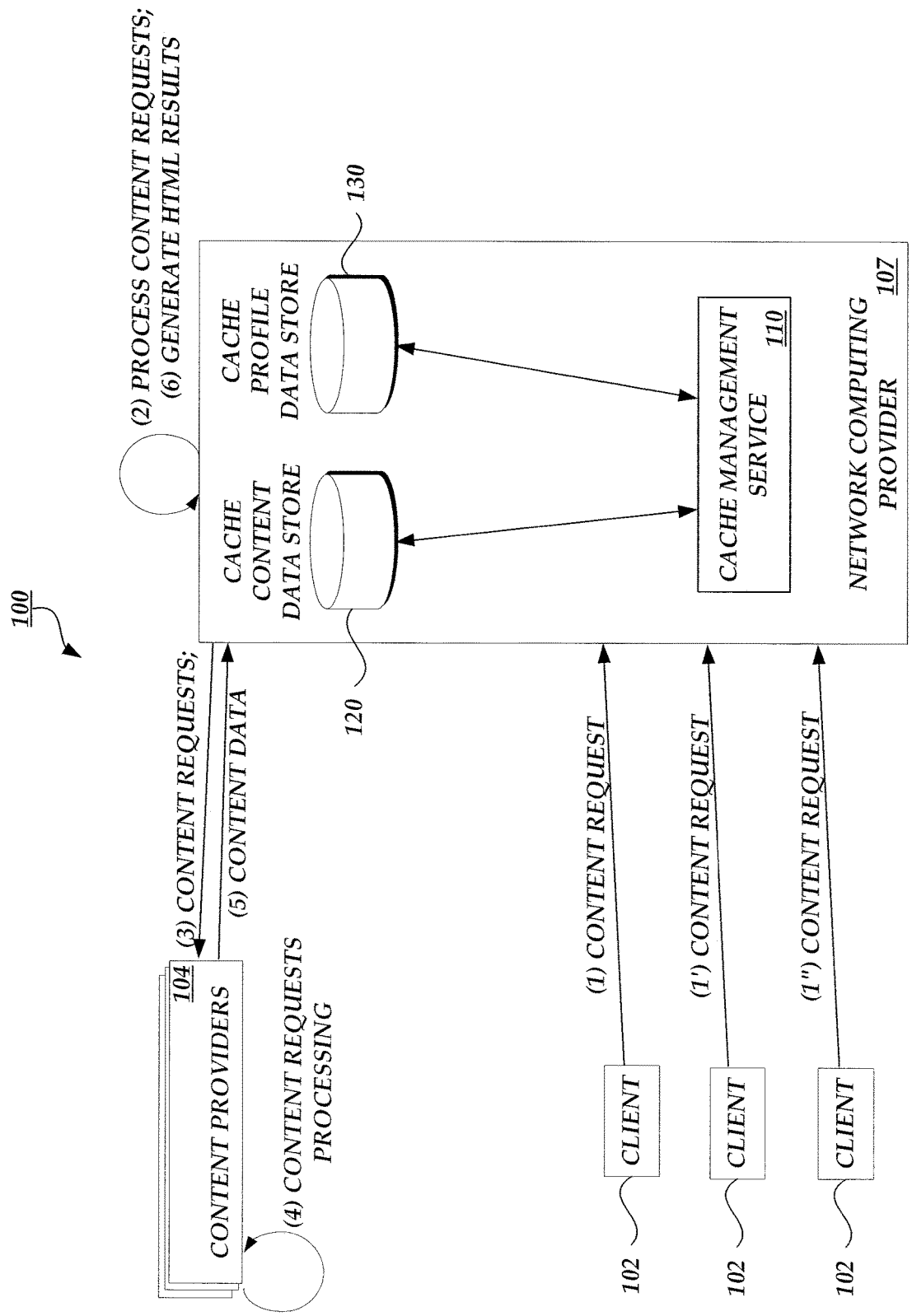
FIGS. 3A and 3B are simplified block diagrams of the networked computing environment of FIG. 1 illustrating the embodiments associated with the analysis of content requests and resulting content and the creation or updating of cache profiles by a cache management service.
Figure 3B:
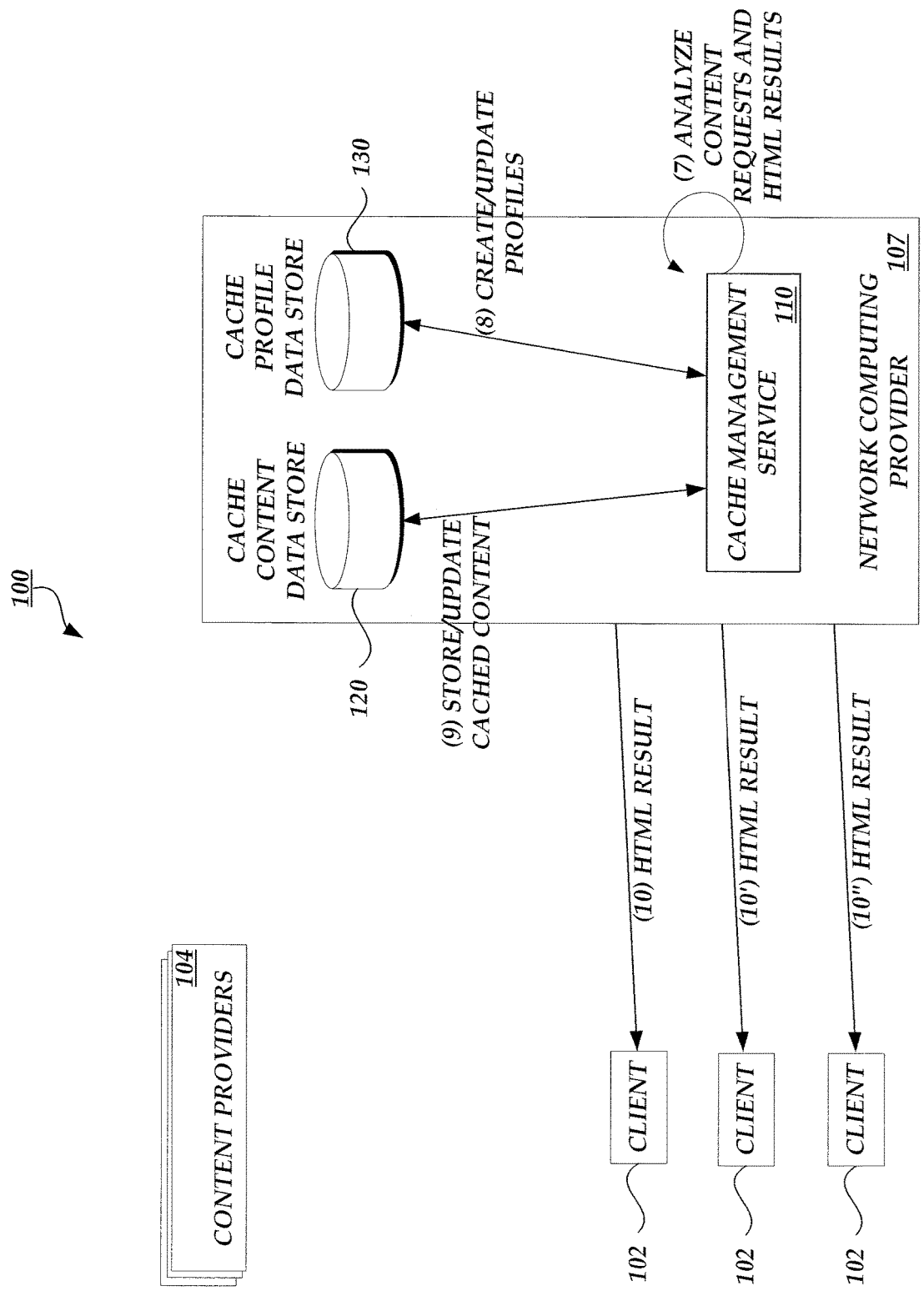

FIGS. 3A and 3B are simplified block diagrams of the networked computing environment 100 of FIG. 1 illustrating the embodiments associated with the analysis of content requests and HTML results and the creation or updating of cache profiles by a cache management service 110. With reference to FIG. 3A, at (1), a network computing provider 107 obtains requests for content from client computing devices 102. Illustratively, individual client computing devices 102 may load a browser for viewing network content in response to an event or user request. The browser may be implemented to request network content via a browse session request to the network computing provider 107. From the perspective of the user of the client computing device 102, the request for the new browse session corresponds to the intended request being transmitted to one or more corresponding content providers 104. Illustratively, this request may be generated automatically as a result of the browser loading (e.g., a request for a default or "home" page), or may be generated as a result of a user following a link or entering a network address into an address bar of the browser.

As illustrated in FIG. 3A, the browse session request is transmitted first to the network computing provider 107. In an illustrative embodiment, the network computing provider 107 utilizes an application program interface (hereinafter "API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc. This information can be obtained by a cache management service 110 directly, or, relayed, or filtered by a virtual machine or browser instance hosted by an NCC of the network computing provider 107 that services the browse session request.

At (2), the network computing provider 107 processes individual content requests. The network computing provider 107 can transmit a request for a network resource to a content provider 104 based, at least in part, on a network address included in the browse session request at (3). For example, a browse session request may include a URL for a web page, such as "http://www.xyzsite.com/default.htm."

With continued reference to FIG. 3A, at (4), the content requests are received and processed by a content provider 104, such as through an associated Web server. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is to be displayed on the client computing device 102 via the processing of information, such as HTML, and the like. Subsequently, at (5), the content provider 104 transmits the identified content to the network computing provider 107. At (6), the network computing provider 107 generates HTML results corresponding to the content requests obtained from the client computing devices 102. In some embodiments where relevant pre-cached content is not available to the network computing provider 107, complete HTML results responsive to respective content requests can be generated solely based on content obtained from the content providers 104.

With reference to FIG. 3B, at (7), the complete HTML results provided by various content providers 104 and their corresponding content requests can be analyzed by the cache management service 110 for cache profile building and updating. For example, the analysis can be performed on content requests and corresponding HTML results that are generated during a specified period of time. Specifically, for content requests directed to a same identifiable network resource, the cache management service 110 may analyze corresponding HTML results, and determine one or more parts of HTML that are do not change during the specified period of time. For example, the parts can correspond to HTML code that causes a browser application to render navigation bars, logos, layouts, structures, etc. In another example, the cache management service 110 can also include for variations in HTML code that would be considered within a tolerance in analyzing the code. In other words, variations within the tolerance would not be considered a change when the parts of HTML are determined.

Accordingly, at (8), a cache profile corresponding to the network resource and the determined parts can be built and stored at a cache profile data store 130. Parts that do not change may appear in HTML results corresponding to a group of distinct network resources. Therefore, individual cache profiles can correspond to a group of network resources and their common invariable parts. Further, analysis of content requests and corresponding HTML results can be performed across attributes such as client computing devices, users or user related data, network resource identifiers, or any attributes associated with content requests or resulting responses, to determine common or invariable HTML parts.

The HTML parts need not be absolutely invariable throughout a specified period of time, rather, the determination can be based, at least in part, on a cacheable status or indication provided by corresponding content providers or derived from the analysis. Various clustering, classification or other computational or machine learning methods can be utilized to identify or define groups of content requests, their corresponding responses and cacheable HTML parts. The groups may or may not be mutually exclusive. Accordingly, cache profiles corresponding to the groups or individual content requests can form a hierarchy, such as a tree structure or lattice. Each cache profile may include a profile indicator that specifies the attributes or criteria of content requests matching the profile. Alternatively, or in addition, each cache profile may include a profile member-list which enumerates content requests matching the profile. In the case where cache profiles form a hierarchy, each cache profile may reference their parent or child cache profiles.

At (9), the cacheable content corresponding to the determined part(s) can be stored at a cache content data store 120 and identified or referenced by the cache profile. At (10), HTML results are transmitted from the network computing provider 107 to respective client computing devices 102. In some embodiments, an HTML result or information accompanying the result, may indicate cacheable content within the HTML result and instruct a corresponding client computing device 102 to retain the cacheable content for future use.

Figure 3C:
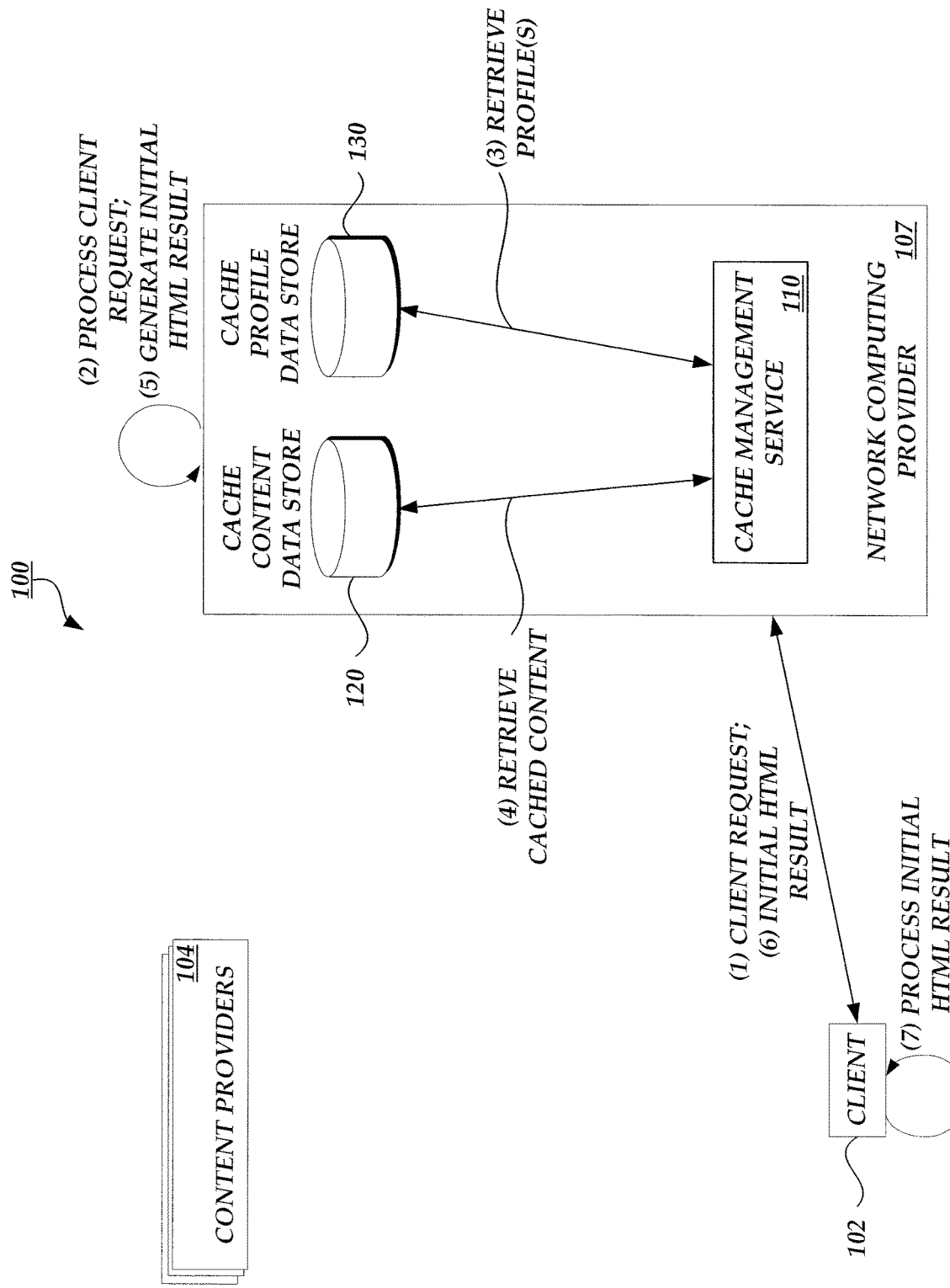
FIGS. 3C and 3D are simplified block diagrams of the networked computing environment of FIG. 1 illustrating embodiments associated with the processing of a client request for content by a cache management service, a network computing provider and content providers.
Figure 3D:
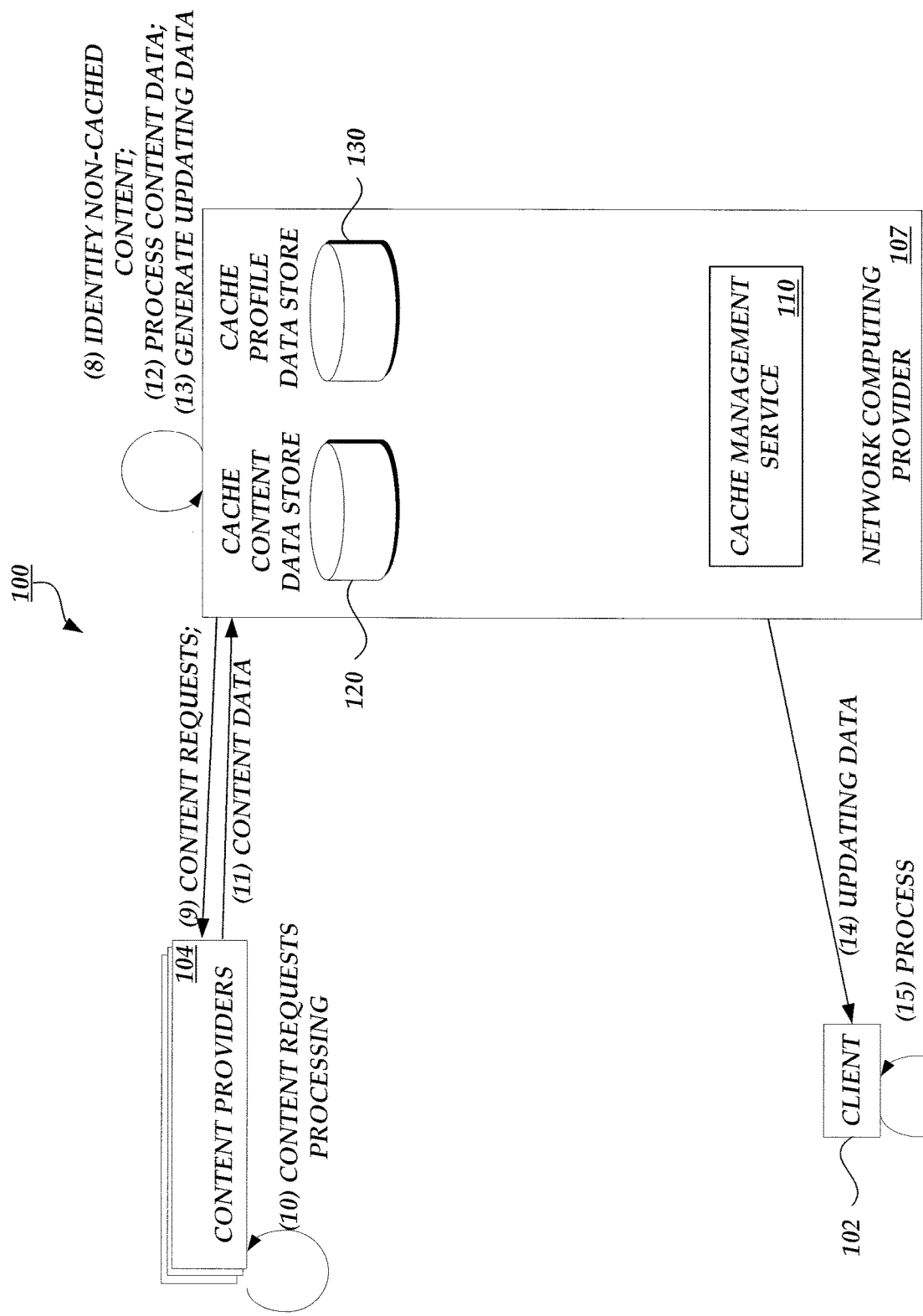

FIGS. 3C and 3D are simplified block diagrams of the networked computing environment 100 of FIG. 1 illustrating embodiments associated with the processing of a resource request by a cache management service, a network computing provider and content providers. Specifically, FIGS. 3C and 3D illustrate examples of utilizing cached content parts in processing content requests from client computing devices 102. With reference to FIG. 3C, at (1), the cache management service 110 obtains a request for content from a client computing device 102. As described above, the request for content can be part of a browse session request sent by the client computing device 102, and may be relayed to the cache management service 110 by an NCC of the network computing provider 107 which services the browse session.

Upon receipt of the request, at (2), the cache management service 110 processes the client request to identify one or more cache profiles stored at a cache profile data store 130 that match the client request. For example, the client request may be identified on a profile member-list or have attributes specified by a profile indicator of a cache profile. Specifically, if there is a hierarchy of cache profiles, a top-down search scheme can be implemented for the identification of matching cache profiles. For example, the client request can be matched against more general cache profiles (corresponding to more content requests) from the top of the hierarchy, and subsequently be matched against more and more specific cache profiles (corresponding to fewer and fewer content requests) referenced by a matching parent cache profile.

At (3), the cache management service 110 can retrieve cached content parts from a cache content data store 120 as identified by the matching cache profiles. The cached content parts can be retrieved after all matching cache profiles are identified. Alternatively, cached content parts can be retrieved while the cache profile matching process is ongoing. For example, content parts identified by more general cache profiles, such as a uniform Web site layout, structure or logo, are retrieved sooner than content parts identified by more specific cache profiles, such as text description or images associated with a particular Web page of the site. At (5), the cache management service 110 can generate initial HTML result based, at least in part, on the retrieved content parts and transmit it to the requesting client computing device 102 for partial content rendering in response to the content request at (6). In the case where cached content parts are retrieved sequentially as described above, the initial HTML result can include multiple parts that are transmitted sequentially. At (7), the client computing device 102 can process the initial HTML result, for example, to render and present the cached content parts, as part of a response to its content request. As another example, the client computing device 102 may render and present locally cached content as referenced or indicated by the initial HTML result and wait for corresponding updates.

Illustratively, once a client computing device 102 has obtained an initial HTML result, the network computing provider 107 can request any remaining, non-cached versions of the HTML. With reference to FIG. 3D, at (8), the network computing provider 107 identifies one or more parts of the requested content that are non-cached. At (9), the network computing provider 107 may request non-cached content or updates to the cached content from third party content providers, subsequent to or in parallel with the retrieval of cached content. As described above with reference to FIG. 3A, a content request is received and processed by a content provider 104, such as through an associated Web server. In accordance with an illustrative embodiment, the request for content can be in accordance with common network protocols, such as HTTP.

Upon receipt of the content request, at (10), the content provider 104 identifies the appropriate responsive content. In some embodiments, the content request is to inquire about updates to content cached at the network computing provider 107 or an associated location. In this case, the content provider 104 needs to determine whether there has been any applicable content update. Subsequently, the content provider 104 transmits the identified content or update(s) to the network computing provider 107 at (11).

At (12), the network computing provider 107 can process the obtained contents. For example, to integrate the obtained contents or updates with the initial results, and generate a complete HTML result responsive to the content request. Alternatively, or in addition, the network computing provider 107 can forward non-cached content or updates to the cached content to the cache management service for processing, such as converting to a form of data compatible with the initial results. At (13), the cache management service 110 can generate updating data applicable to the initial HTML result based, at least in part, on the complete HTML, or based, at least in part, on the non-cached content and updates. The updating data can then be communicated to the requesting client computing device 102 at (14), enabling which to render a complete representation of the requested content. At (15), the client computing device 102 processes the updating data. The client computing device 102 can consolidate the updating data with the initial HTML result, for example, via execution of specialized scripts embedded in the initial HTML results, thus render and present a complete response to the initial content request. The client computing device 102 may also update its locally cached content based the updating data. In some embodiments, feedback can be obtained from the requesting client computing device 102 regarding the partial as well as complete content rendering, which may trigger updating of relevant cache profiles and contents.

Figure 4:
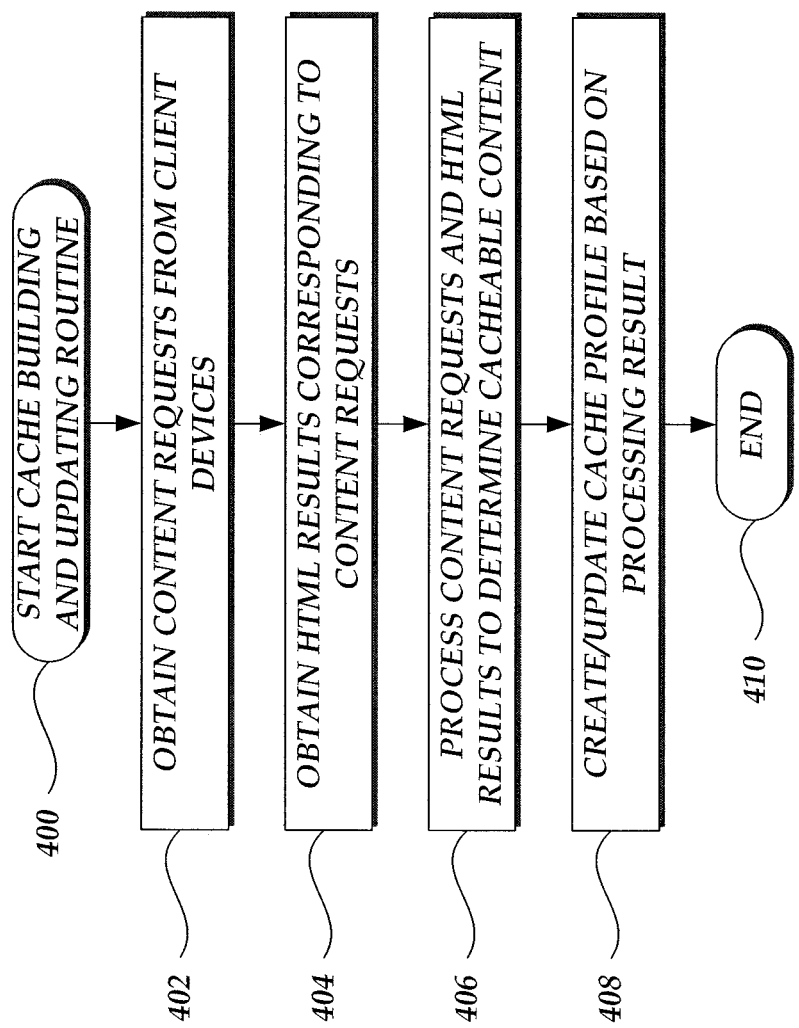
FIG. 4 is a flow diagram of an illustrative method for cache building or cache updating implemented by a cache management service.

FIG. 4 is a flow diagram of an illustrative method for cache building or cache updating. Illustrative, routine 400 can be implemented by a content analysis module 204 of the cache management service 110. The implementation of routine 400 can also be facilitated by an interface module 202 of the cache management service 110, or by other components of a network computing provider 107 that hosts the cache management service 110. The routine 400 can be initialized by a system administrator of the cache management service 110 or of the network computing provider 107, can be scheduled to execute at certain times, can be a continuously running process on one or more network computing providers 107, etc. After initialization, at block 402, the cache management service 110 obtains content requests that originate from one or more client computing devices 102. As described in detail above, illustratively, the network computing provider 107 receives content requests from a variety of client computing devices 102. The content requests can be obtained by the cache management service 110 directly, or can be forwarded by another component of the network computing provider 107. Information about the requests can be stored in a data store for use. For example, the information can be electronically stored in memory, a database, on a hard disk, etc. The information can include a resource identifier for each resource that has been requested, the time and date that each resource was requested, client computing device information, browser information, user information and preference, etc.

At block 404, the cache management service 110 obtains HTML results corresponding to the obtained content requests. As described in detail above, the network computing provider 107 can generate complete HTML results incorporating any cached content parts, non-cached parts and updates to cached parts, responsive to content requests from client computing devices 102. The complete HTML results can be forwarded to the cache management service 110. Alternatively, or in addition, the cache management service 110 can derive complete HTML results from cached content parts or initial HTML results that incorporate cached parts, and non-cached parts and updates to cached parts as they are obtained and forwarded by the network computing provider 107. HTML results corresponding to individual content requests can be stored in a data store for use. For example, the HTML results can be electronically stored in memory, a database, on a hard disk, etc. An HTML result can include structured text, such as headings, paragraphs, lists, links, or quotes, embedded images, other objects, or scripts, as well as CSS information to define the appearance and layout of the HTML result.

At block 406, the routine 400 can process and analyze obtained content requests and corresponding HTML results, to determine cacheable content. The network computing provider 107 and cache management service 110 can process content requests and respond with HTML results for any number of separate client computing devices 102, and are therefore in a position to recognize patterns in the content requests and corresponding HTML results. The cache management service 110 can use those patterns to determine the cacheable parts of HTML results in response to content requests, can actively monitor those results for changes, and can create or update cache profiles accordingly.

In some embodiments, the requests and HTML results can be processed temporally for determination of cacheable content parts within the HTML results. For example, HTML results corresponding to request for a specific network resource can be monitored to determine which part(s) within the results do not change over a specified period of time.

These invariable parts can represent navigation bars, logos, layouts, structures, backgrounds, texts or other elements. In one embodiment, the determination of parts can be facilitated by semantics of an HTML result, such as an HTML Web page. For example, defining parts based, at least in part, on HTML elements that are indicated by paired tags or single tags. Because the routine 400 can be a continuous process, new part(s) of a network resource may initially be considered variable and later be recognized as invariable. Content corresponding to the invariable parts within the HTML results of a specific network resource can be labeled as cacheable, and stored or updated at a cache content data store 120. Cacheable content can also be transmitted to and retained by client computing devices 102, for example, transmitting the cacheable content to a browser implemented on a client computing device 102 and instructing the browser to store the cacheable content in its cache for future use.

In other embodiments, the process and analysis can be based, at least in part, on attributes associated with obtained content requests. Cacheable content parts of HTML results corresponding to content requests associated with certain attributes or combination of attributes can be determined. These attributes can be any information included or derived from content requests originated from client computing devices 102. For example, network resource identifiers associated with a specific content provider, domain, subdomain, Website, sub-site or any other classification of network resources, users association, preferences or other information, association, affiliation, or other information of client computing devices, etc. Common parts to all obtained HTML results corresponding to an attribute or combination of attributes can be determined, and content corresponding to the common parts can be labeled as cacheable, and stored or updated at the cache content data store 120. Cacheable content can also be transmitted to and retained by client computing devices 102, for example, transmitting the cacheable content to a browser implemented on a client computing device 102 and instructing the browser to store the cacheable content in its cache for future use.

In still other embodiments, the process and analysis can be both temporal and attribute-based. For example, all HTML results corresponding to an attribute or combination of attributes can be monitored for determination of their common part(s) what do not change over a specified period of time. Content corresponding to the invariable common parts can be labeled as cacheable, and stored or updated at the cache content data store 120. Cacheable content can also be transmitted to and retained by client computing devices 102, for example, transmitting the cacheable content to a browser implemented on a client computing device 102 and instructing the browser to store the cacheable content in its cache for future use.

In still further embodiments, the process and analysis can employ any computational, statistical, or machine learning methods suitable for clustering, classification, or time series analysis of the obtained content requests and corresponding HTML results. A suitable method can group content requests and corresponding HTML results as appropriate based, at least in part, on any associated information and determine invariable or common parts and corresponding cacheable content of the results. A suitable method can also utilize any extrinsic information or knowledge about cacheable parts determination, to facilitate the process and analysis. In one embodiment, techniques such as collaborative filtering can be utilized to process and incorporation the extrinsic information or knowledge. Again, cacheable content can be stored or updated at the cache content data store 120. Cacheable content can also be transmitted to and retained by client computing devices 102, for example, transmitting the cacheable content to a browser implemented on a client computing device 102 and instructing the browser to store the cacheable content in its cache for future use.

Content corresponding to invariable or common parts may or may not be independently presentable or render-able by a browser, therefore, in some embodiments, only content independently presentable or render-able are labeled as cacheable and/or stored at the cache content data store 120. Some network resources or content may be more frequently requested than others, therefore, in some embodiments, the process and analysis described above may be prioritized based the frequency of corresponding requests. In other embodiments, a threshold can be specified so that only network resources or content that have been requested more frequently than the threshold are analyzed.

Some content providers may also provide information to facilitate the process and analysis for determination of cacheable content parts within HTML results. For example, content providers may include cacheable status or indication in headers or other parts associated with the transmission of a requested network resource. Content providers may also define semantics for associated network resources so that the cacheable status can be embedded therein. In these cases, the network resources having cacheable parts can be polled at predetermined or dynamically calculated intervals as part of the process and analysis. The routine 400 can also use automated techniques, including bots, web crawlers, indexers, and the like to continuously monitor the cacheable status of content.

At block 408, corresponding cache profiles are created or updated. As described earlier, cache profiles can be stored at a cache profile data store 130. The cache profiles can form a hierarchy, such as a tree structure or lattice. Each cache profile corresponds to respectively determined invariable or common part(s) at block 406, and may include a profile indicator that specifies the attributes or criteria of content requests matching the profile. Alternatively, or in addition, each cache profile may include a profile member-list, which enumerates content requests matching the profile. In the case where cache profiles form a hierarchy, each cache profile may reference their parent or child cache profiles.

In some embodiments, existing cache profiles corresponding to certain determined invariable or common parts can be updated with newly determined information such as identification of correspondingly stored or updated content at block 406, updated profile indicator or member-list based, at least in part, on the process and analysis at block 406. For the invariable or common parts determined at block 406 that do not correspond to an existing cache profile, new cache profiles can be created accordingly and stored at the cache profile data store 130. The routine 400 ends at block 410.

Figure 5:
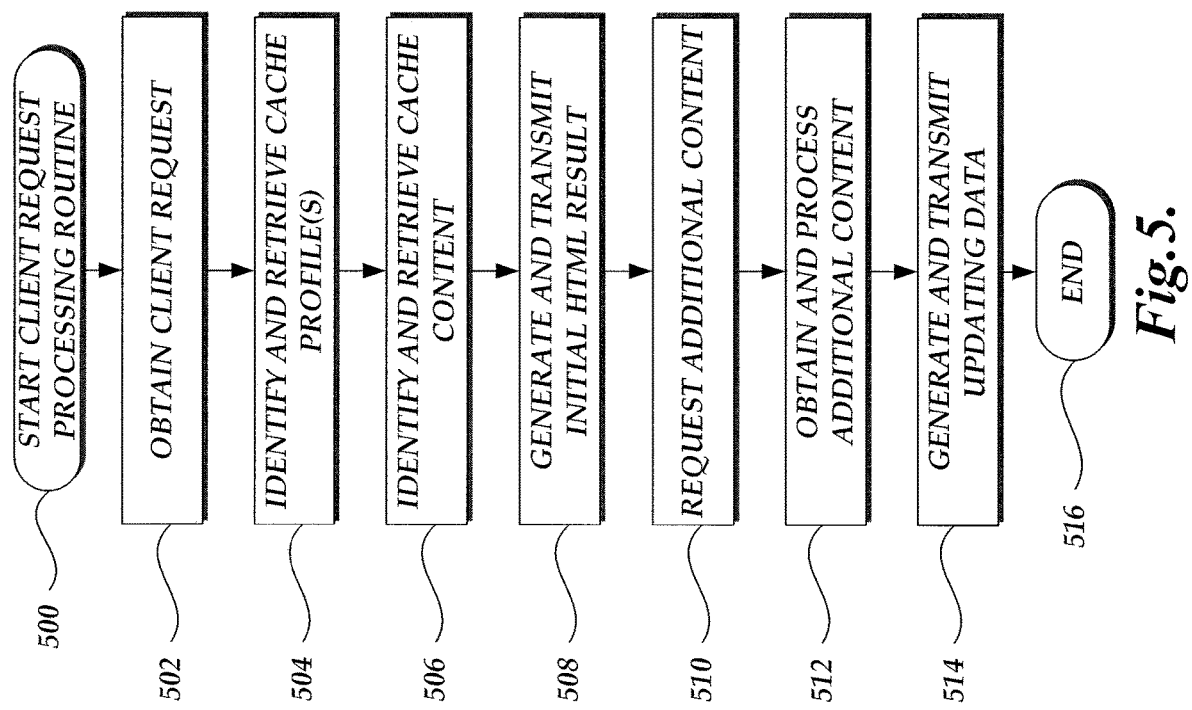
FIG. 5 is a flow diagram of an illustrative method for processing a client request for content implemented by a network computing provider.

FIG. 5 is a flow diagram of an illustrative method for processing a client request for content implemented at a network computing provider 107. The client request processing routine 500 begins at block 502, when the network computing provider 107 obtains a client request for content from a client computing device 102. The process can begin with the generation and processing of a new browse session request, which can include or indicate the client request for content and other relevant information, from a client computing device 102 to a network computing provider 107. The client computing device 102 can load a browser for viewing network content in response to an event or user request. Subsequent to the browser being loaded, the browser may be configured to request a new browse session. In some embodiments, the request for a new browse session may be automatic upon browser loading, or may be the result of an event such as a command or request from the user of the client computing device 102.

At block 504, the routine 500 identifies and retrieves one or more cache profiles that match the client request, from a cache profile data store 130. As described earlier, a client request can be matched to a cache profile based, at least in part, on any information associated with the request. In one embodiment, the client request can be compared against a profile member-list of a cache profile to determine whether there is a match. In another embodiment, the client request for content can include information such as network resource identifiers for each resource that has been requested, the time and date that each resource was requested, client computing device information, browser information, user information and preference, etc. Any single piece or combination of such information can be compared to a profile indicator of a cache profile to determine whether there is a match. The comparisons described above may not be literal; rather, generalization and association of attributes and relevant fuzzy logic can facilitate the process.

As described earlier, cache profiles can form a hierarchy representing, for example, a tree structure or lattice. A parent cache profile at a higher level is more general than a corresponding child cache profile at a lower level, and can be matched to a superset of content requests. Therefore, the matching process can adopt a top-down scheme whereby cache profiles located higher in the hierarchy can be matched against earlier. For example, initially the client request can be matched against cache profiles at the top level in the hierarchy. If there is a match, the client request can be matched against child cache profiles of the matching cache profile, and so on.

At block 506, the routine 500 identifies and retrieves cached content based, at least in part, on the matching cache profiles. In one embodiment, identification of cached content is provided by the matching cache profiles. The identification can be a reference, pointer or address of a location at a cache content data store 120, where the cached content corresponding to a cache profile is stored or maintained. In another embodiment, the client request may indicate whether relevant content is cached locally at the requesting client computing device 102. The routine 500 may determine whether the locally cached content needs updating, by looking up corresponding cached content as identified by one or more matching cache profiles.

At block 508, the routine 500 generates an initial HTML result in response to the client request and transmits it to the requesting client computing device 102. The initial HTML result can incorporate the retrieved cached content and can include an element or mechanism to accommodate additional content or updating data. For example, the initial HTML result can include one or more scripts or other space holders, which serve as a conduit for additional content or updates, to ensure a complete and accurate final rendering of content in response to the client request. In some embodiments, the initial HTML result can reference content cached locally at the requesting client computing device 102. In other embodiments, the initial HTML result or accompanying information can indicate or instruct that the requesting client computing device 102 should retain certain content part of the initial HTML result for faster access in the future.

At block 510, the routine 500 requests additional content from content providers 104 or associated CDN service providers. This can be accomplished by a virtual machine or browser instantiated at an NCC, which services the client request. The additional content requests can be determined based, at least in part, on a comparison of the client request and cached content incorporated in the initial HTML result. For example, non-cached content and updates to cached content can be requested. In one embodiment, the entirety of a network resource whose content is partially cached needs to be requested, so that the non-cached content part(s) as well as updates to cached content part(s) can be obtained. In another embodiment, a content provider 104 or associated CDN service provider may support mechanisms, such as an API, to allow for content requests directed at specified part of a network resource, such as text, image or other objects between a specified pair of tags in an HTML document. In this case, non-cached content that constitute part of a network resource can be requested independently. In still another embodiment, a content provider 104 or associated CDN service provider may also support mechanisms, such as an API, to allow for content update inquiries corresponding to a specified part of a network resource. In this case, updates to cached content that constitute part of a network resource can be determined without obtaining the content part itself.

At block 512, routine 500 obtains and processes the additional content and/or updates. Based, at least in part, on the initial HTML result (or the cached content incorporated therein) and the newly obtained information, a complete HTML result can be generated by the filling in the non-cached content parts and updating the cache parts. Alternatively, or in addition, the obtained content and updates can be forwarded to the cache management service 110 for processing as describe below.

At block 514, updating data to the initial HTML result is generated and transmitted to the requesting client computing device 102. In one embodiment, a complete HTML result is generated and provided by the network computing provider 107. Updating data can be generated by comparing the complete and initial HTML result and identifying differences. Data reflecting the differences can be transmitted to the requesting client computing device 102 and fed into the rendering of a final representation of content in response to the client request. For example, the data can be obtained and applied by one or more scripts included in the initial HTML result. In another embodiment, the cache management service 110 processes the obtained content and updates directly. The cache management service 110 can convert non-cached content and updates to cached content into data that feeds into the rendering of the final representation of content, as described above, at the client computing device 102. The routine 500 ends at block 516.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM or network interface. Further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining a plurality of requests for network resources over a specified period of time;
   obtaining a plurality of HTML results, wherein individual HTML results of the plurality of HTML results correspond to individual requests of the plurality of requests for network resources, and wherein individual HTML results of the plurality of HTML results correspond to different web pages;
   analyzing the plurality of HTML results to identify a first temporally invariable part associated with a first subset of the plurality of HTML results;
   determining a first HTML content associated with the first subset of the plurality of HTML results based, at least in part, on the first temporally invariable part;
   storing the first HTML content;
   identifying a first subset of the plurality of requests that corresponds to the first subset of the plurality of HTML results, comprises individual requests that correspond to different web pages, and has one or more attributes shared by the individual requests; and
   creating a first cache profile for a first category of requests for network resources, wherein the first cache profile is based on the first temporally invariable part and the stored first HTML content, and wherein the first cache profile corresponds to the one or more attributes.

2. The computer-implemented method of claim 1, further comprising:
   analyzing the plurality of HTML results to identify a second temporally invariable part associated with a second subset of the plurality of HTML results, wherein the second subset of the plurality of HTML results includes the first subset of the plurality of HTML results; and
   creating a second cache profile for a second category of requests for network resources, wherein the second cache profile is based at least in part on the second temporally invariable part.

3. The computer-implemented method of claim 2, wherein the second subset of the plurality of requests consists of requests for one or more network resources of a set of network resources over the specified period of time.

4. The computer-implemented method of claim 2, wherein the second cache profile references the first cache profile.

5. A non-transitory computer-readable storage medium storing computer-executable instructions that when executed by a processor perform operations comprising:
   obtaining a plurality of requests for network resources and a plurality of responses corresponding to the plurality of requests, wherein individual responses of the plurality of responses correspond to different web pages;
   identifying a first temporally invariable part from a first subset of the plurality of responses;
   identifying a first subset of the plurality of requests that corresponds to the first subset of the plurality of responses, comprises individual requests that correspond to different web pages, and has a first attribute associated with individual requests; and
   creating a first cache profile for a first category of requests for network resources, wherein the first cache profile indicates a relationship between the first attribute and the first temporally invariable part.

6. The non-transitory computer-readable storage medium of claim 5, wherein the first cache profile indicates a first content item, further comprising:
   determining the first content item based, at least in part, on the first temporally invariable part; and
   storing the first content item.

7. The non-transitory computer-readable storage medium of claim 6, wherein the first cache profile references a second cache profile.

8. The non-transitory computer-readable storage medium of claim 7, wherein the second cache profile indicates a relationship between a second attribute and a second temporally invariable part identified from a second subset of the plurality of responses.

9. The non-transitory computer-readable storage medium of claim 7, wherein the second cache profile indicates a second content item.

10. A system comprising:
    a processor and a memory for executing computer-executable instructions, the computer-executable instructions implementing an interface component that is operative to:
    obtain a first request for a network resource;
    determine, based at least in part on an attribute of the first request, that the first request corresponds to a first category of requests for different network resources, wherein the first category of requests for different network resources corresponds to a first cache profile of a plurality of cache profiles, and wherein the first cache profile is based on a first temporally invariable part;
    retrieve a first content item based, at least in part, on the first cache profile, wherein the first content item corresponds to a temporally invariable portion of content identified based at least in part on an analysis of a plurality of requests for network resources, wherein individual requests of the plurality of requests for network resources correspond to different web pages and have at least one attribute in common;

generate a first result incorporating the first content item; and transmit the first result; and the computer-executable instructions implementing a data processing component that is operative to:

obtain a second request for an additional content item based, at least in part, on the first request;

obtain the additional content item;

generate an additional result incorporating the additional content item; and transmit the additional result.

11. The system of claim 10, wherein determining that the first request corresponds to the first cache profile comprises comparing the attribute of the first request with an attribute indicated by the first cache profile.

12. The system of claim 11, wherein comparing the attribute of the first request with the attribute indicated by the first cache profile comprises comparing a network resource identifier included in the first request with the attribute indicated by the first cache profile.

13. The system of claim 11, wherein comparing the attribute of the first request with the attribute indicated by the first cache profile comprises comparing a user identifier associated with the first request with the attribute indicated by the first cache profile.

14. The system of claim 11, wherein comparing the attribute of the first request with the attribute indicated by the first cache profile comprises comparing a client computing device identifier associated with the first request with the attribute indicated by the first cache profile.

15. The system of claim 10, wherein identifying the first cache profile comprises matching the first request against a list of requests indicated by the first cache profile.

16. The system of claim 10, wherein the interface component is further operative to cause processing of at least one of the first result or the additional result, at a computing device that requested the network resource.

17. The system of claim 10, wherein generating the first result comprises:

retrieving a second content item based at least in part on a second cache profile; and generating the first result incorporating the first and second content items.

18. The system of claim 10, wherein the interface component is further operative to:

identify a second cache profile corresponding to the first request;

retrieve a second content item based at least in part on the second cache profile;

generate a second result incorporating the second content item; and transmit the second result.

19. The system of claim 18, wherein identifying the second cache profile comprises:

comparing the attribute of the first request with an attribute indicated by the second cache profile, wherein the second cache profile is referenced by the first cache profile.

* * * * *